(12) United States Patent
Choi (10) Patent No.: US 12,319,255 B2
(45) Date of Patent: Jun. 3, 2025

(54) PISTON PUMP FOR BRAKE SYSTEM

(71) Applicant: HYUNDAI MOBIS Co., Ltd., Seoul (KR)

(72) Inventor: Young Chang Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 258 days.

(21) Appl. No.: 17/531,502

(22) Filed: Nov. 19, 2021

(65) Prior Publication Data

US 2022/0185257 A1 Jun. 16, 2022

(30) Foreign Application Priority Data

Dec. 11, 2020 (KR) .......................... 10-2020-0173062

(51) Int. Cl.
*B60T 17/02* (2006.01)
*B60T 11/236* (2006.01)
(Continued)

(52) U.S. Cl.
CPC ............. *B60T 17/02* (2013.01); *B60T 11/236* (2013.01); *B60T 13/16* (2013.01); *F04B 1/12* (2013.01);
(Continued)

(58) Field of Classification Search
CPC ............... F16D 65/22; F16D 2125/023; F16D 2125/06; F04B 1/00; F04B 1/12;
(Continued)

(56) References Cited

U.S. PATENT DOCUMENTS

| | | | |
|---|---|---|---|
| 8,388,325 B2 * | 3/2013 | Schmautz | B60T 8/4031 417/545 |
| 2006/0013702 A1 * | 1/2006 | Dinkel | F04B 1/0408 417/559 |

(Continued)

FOREIGN PATENT DOCUMENTS

| | | |
|---|---|---|
| CN | 1748084 A | 3/2006 |
| CN | 101424263 A | 5/2009 |

(Continued)

OTHER PUBLICATIONS

Chinese Office Action dated Aug. 8, 2023, issued in corresponding Chinese Patent Application No. 202111505421.6.
(Continued)

*Primary Examiner* — Robert A. Siconolfi
*Assistant Examiner* — San M Aung
(74) *Attorney, Agent, or Firm* — Morgan, Lewis & Bockius LLP (57) ABSTRACT

According to at least one aspect, the present disclosure provides a piston pump comprising: a piston unit configured to reciprocate by driving of a motor cam; a sleeve unit disposed to surround at least a part of the piston unit and having a space in which brake oil is stored; and a check valve unit facing the sleeve unit and discharging the brake oil to an outside of the sleeve unit when a pressure of the brake oil increases, wherein the piston unit includes a first piston having a first end in contact with the motor cam and reciprocating, a second piston having a first end coupled to a second end of the first piston and configured to press the brake oil, and a spring cap coupled to a second end of the second piston and disposed to accommodate an inlet spring therein.

8 Claims, 5 Drawing Sheets

(51) Int. Cl.
*B60T 13/16* (2006.01)
*F04B 1/12* (2020.01)
*F04B 9/04* (2006.01)
*F04B 53/10* (2006.01)
*F04B 53/12* (2006.01)
*F04B 53/14* (2006.01)
*F16D 65/22* (2006.01)
*F16D 125/02* (2012.01)
*F16D 125/06* (2012.01)
*F16K 15/04* (2006.01)

(52) U.S. Cl.
CPC .......... *F04B 9/042* (2013.01); *F04B 53/1002* (2013.01); *F04B 53/12* (2013.01); *F04B 53/14* (2013.01); *F16D 65/22* (2013.01); *F16K 15/044* (2013.01); *B60T 2270/10* (2013.01); *F16D 2125/023* (2013.01); *F16D 2125/06* (2013.01)

(58) Field of Classification Search
CPC .... F04B 1/0408; F04B 1/0421; F04B 1/0426; F04B 1/0452; F04B 9/042; F04B 53/12; F04B 53/14; F04B 53/20; F04B 53/126; F04B 53/168; F04B 53/1002
USPC .......................................................... 303/10
See application file for complete search history.

(56) References Cited

U.S. PATENT DOCUMENTS

| | | | |
|---|---|---|---|
| 2006/0083629 A1* | 4/2006 | Dinkel | F04B 1/0408 417/415 |
| 2007/0092389 A1* | 4/2007 | Dinkel | F04B 53/168 417/554 |
| 2009/0110571 A1 | 4/2009 | Kim | |
| 2010/0266427 A1* | 10/2010 | Haecker | F04B 53/02 417/273 |
| 2013/0202465 A1* | 8/2013 | Jahn | F04B 53/126 417/437 |
| 2017/0191563 A1* | 7/2017 | Horning | F04B 19/003 |
| 2017/0333963 A1* | 11/2017 | Cho | B21B 17/08 |
| 2020/0262401 A1* | 8/2020 | Kurz | F04B 1/0421 |

FOREIGN PATENT DOCUMENTS

| | | | | |
|---|---|---|---|---|
| DE | 19854715 A1 * | 5/2000 | | B60T 8/4031 |
| DE | 19928164 A1 * | 12/2000 | | B60T 17/02 |
| KR | 10-2005-0099624 A | 10/2005 | | |

OTHER PUBLICATIONS

Office Action issued on Jan. 30, 2025 in Korean Patent Application No. 10-2020-0173062 with English Translation.

\* cited by examiner

FIG. 1

-RELATED ART-

PISTON PUMP FOR BRAKE SYSTEM

CROSS-REFERENCE TO RELATED APPLICATION

This application claims the benefit of priority to Korean Patent Application No. 10-2020-0173062 filed on Dec. 11, 2020 in the Korean Intellectual Property Office, the entire disclosure of which is incorporated herein by reference.

TECHNICAL FIELD

The present disclosure relates to a piston pump for a brake system.

BACKGROUND

The information disclosed in the Background section herein is to aid in the understanding of the background of the present disclosure, and should not be taken as acknowledgement that this information forms any part of prior art.

Figure 1:
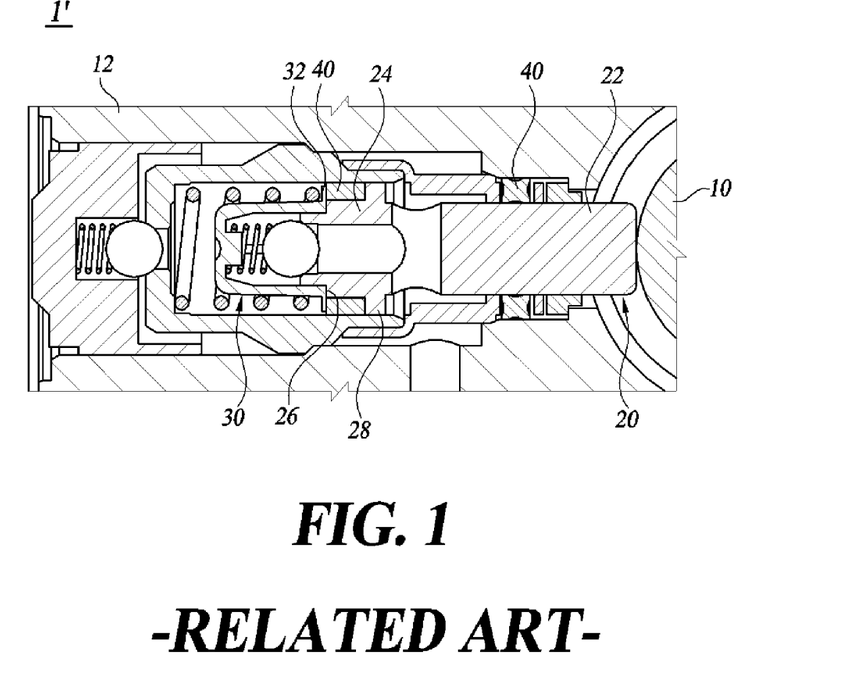
FIG. 1 is a schematic cross-sectional view illustrating a structure of a conventional piston pump for a brake system.

FIG. 1 is a schematic cross-sectional view illustrating a conventional piston pump for a brake system.

Referring to FIG. 1, a conventional piston pump 1' includes a motor cam 10 configured to perform cam movement by driving of a motor (not shown) and a piston unit 20 configured to linearly reciprocate in a piston housing 12.

The conventional piston unit 20 includes a piston body 22, a cap coupling portion 24 of which at least a part is coupled to a spring cap 30, a step unit 26 having an outer diameter greater than an outer diameter of the cap coupling portion 24 and having a function of a stopper which restricts movement of the spring cap 30, and a piston flange 28.

As the piston unit 20 reciprocates, the piston body 22 rubs against a low pressure sealing 40. In this case, a friction coefficient of an outer circumferential surface of the piston body 22 may be lowered for smooth reciprocating movement of the piston unit 20. To this end, when the piston unit 20 is manufactured, a manufacturing process includes a polishing process.

Meanwhile, since the piston unit 20 has a complex shape in which the cap coupling portion 24, the step unit 26, and the piston flange 28 are connected, the complexity and difficulty of the polishing process are increased. Accordingly, there is a problem of increasing a defect rate when the piston unit 20 is manufactured.

In addition, although a portion, which rubs against the low pressure sealing 40, is limited when the piston unit 20 reciprocates, a polishing process is performed the entire piston body 22. Accordingly, due to an unnecessary polishing process, there is a problem of decreasing manufacturing efficiency when the piston pump 1' is manufactured.

In addition, since the piston unit 20 includes the step unit 26 and the piston flange 28, the shape of the piston unit 20 is complex, and thus there is a problem of increasing manufacturing costs.

SUMMARY

The present disclosure is mainly directed to a piston pump that can provide a low defect rate and reduced manufacturing costs by removing an unnecessary polishing process.

In addition, the present disclosure is also directed to a piston pump that provides a high manufacturing efficiency.

The objectives to be solved by the present disclosure are not limited to the objectives described above, and other objectives, which are not described above, will be clearly understood by those skilled in the art through the following description.

According to at least one aspect, the present disclosure provides a piston pump comprising: a piston unit configured to reciprocate in a piston housing by driving of a motor cam; a sleeve unit disposed to surround at least a part of the piston unit and having an accommodation space in which brake oil is stored; and a check valve unit disposed to face the sleeve unit and configured to discharge the brake oil to an outside of the sleeve unit when a pressure of the brake oil stored in the accommodation space of the sleeve unit increases. The piston unit includes a first piston having a first end in contact with the motor cam and configured to reciprocate, a second piston having a first end coupled to a second end of the first piston and operating in conjunction with reciprocating movement of the first piston to press the brake oil stored in the accommodation space of the sleeve unit, and a spring cap coupled to the a second end of the second piston and disposed to accommodate an inlet spring therein.

According to another aspect, the present disclosure provides a piston pump comprising: a piston unit configured to reciprocate in a piston housing by driving of a motor cam; a sleeve unit disposed to surround at least a part of the piston unit, and having an accommodation space in which brake oil is stored; and a check valve unit disposed to face the sleeve unit and configured to discharge the brake oil to an outside of the sleeve unit when a pressure of the brake oil stored the accommodation space of the sleeve unit increases. The piston unit includes a first piston having a first end in contact with the motor cam and configured to reciprocate, a second piston having a first end press-fitted and coupled to a second end of the first piston and operating in conjunction with reciprocating movement of the first piston to press the brake oil stored in the accommodation space of the sleeve unit, and a spring cap disposed to accommodate an inlet spring therein and coupled to a second end of the second piston.

According to the present embodiment described above, since a piston unit according to the present disclosure is formed as an assembly-type piston, a polishing process is simplified, and thus there is an effect of lowering a defect rate. In addition, since the piston unit is formed in a simple structure, there is an effect of lowering manufacturing costs.

In addition, since an unnecessary polishing process is removed, and the piston unit having the simple structure is adopted, there is an effect of lowering manufacturing costs.

REFERENCE NUMERALS

| | | | |
|---|---|---|---|
| 1': | conventional piston pump | 1, 6, 7: | piston pump |
| 10: | motor cam | 12: | piston housing |
| 14: | inlet line | 16: | outlet line |
| 20: | piston unit | 30: | spring cap |
| 40: | low pressure sealing | 100, 600: | piston unit |
| 110, 610: | first piston | 120, 620: | second piston |
| 130, 630: | spring cap | 140: | inlet spring |
| 150: | inlet ball | 160: | first sealing |
| 200: | sleeve unit | 300: | check valve unit |
| 400: | filter | | |

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

In addition, it should be noted that sizes, shapes, and movement distances of elements of each of piston pumps 1 and 6 illustrated in FIGS. 2 to 8 may be expressed to be somewhat exaggerated and distorted for clarity and convenience of description.

Figure 2:
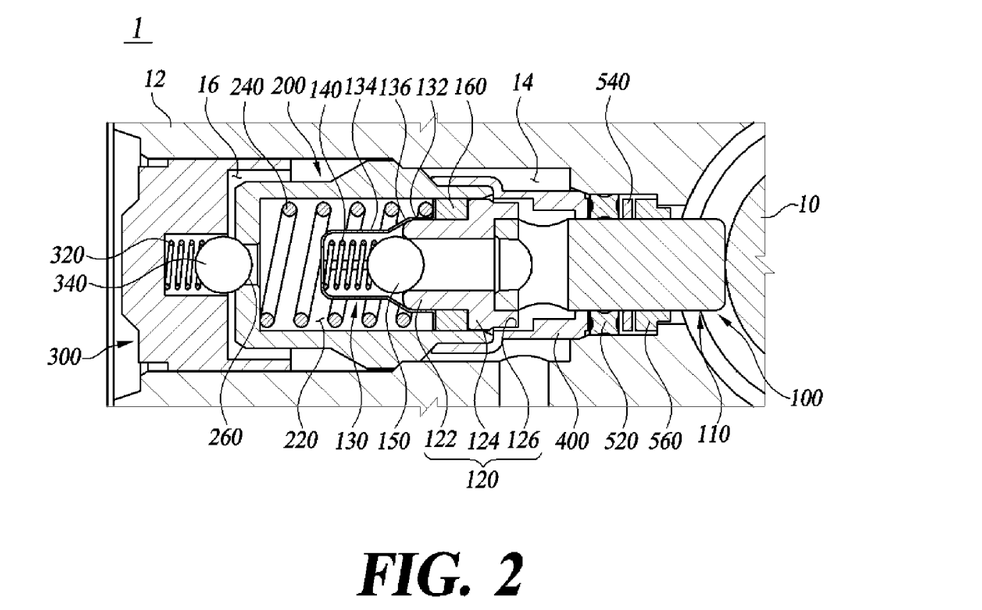
FIG. 2 is a schematic cross-sectional view illustrating a structure of a piston pump for a brake system according to one exemplary embodiment of the present disclosure.
Figure 3:
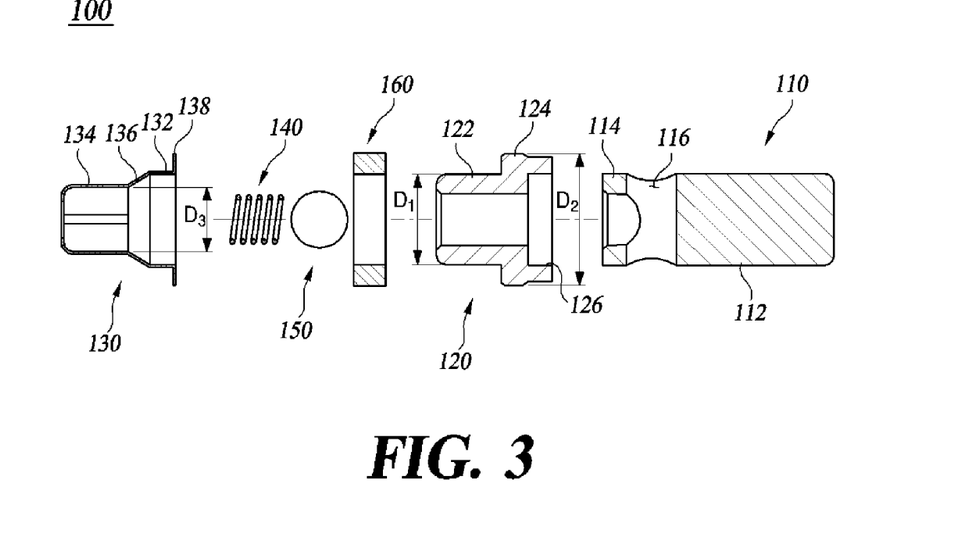
FIG. 3 is an exploded cross-sectional view illustrating a piston unit according to one exemplary embodiment of the present disclosure is dissembled.

FIG. 2 is a schematic cross-sectional view illustrating a structure of the piston pump for a brake system according to one exemplary embodiment of the present disclosure. FIG. 3 is an exploded cross-sectional view illustrating a piston unit according to one exemplary embodiment of the present disclosure is dissembled. A detailed structure of the piston pump 1 for a brake system according to one exemplary embodiment of the present disclosure will be described in detail with reference to FIGS. 2 and 3.

Referring to FIGS. 2 and 3, the piston pump 1 according to one exemplary embodiment of the present disclosure includes all or some of a motor cam 10, a piston housing 12, a piston unit 100, a sleeve unit 200, a check valve unit 300, and a filter 400.

The motor cam 10 is assembled to an output shaft of the motor (not shown) and rotates to perform cam movement when the motor operates. Due to the cam movement of the motor cam 10, the piston unit 100 reciprocates in the piston housing 12 in a longitudinal axis direction. The piston housing 12 is fixed to a vehicle body, and a space in which the elements of the piston pump 1 are assembled is included in the piston housing 12.

The piston unit 100 includes all or some of a first piston 110, a second piston 120, a spring cap 130, an inlet spring 140, an inlet ball 150, and a first sealing 160.

One end of the first piston 110 is in contact with the motor cam 10, and the first piston 110 reciprocates in the piston housing 12 in the longitudinal axis direction by driving of the motor cam 10. The first piston 110 includes all or some of a sliding unit 112, a first coupling unit 114, and an inserting hole 116.

At least a part of the sliding unit 112 is surrounded by a second sealing 520, a backup ring 540, and a guide ring 560. In this case, friction occurs due to the second sealing 520, backup ring 540, and guide ring 560. Furthermore, in the piston unit 100 according to the present disclosure, since a polishing process may be performed on only the first piston 110 where friction actually occurs, there is an effect of lowering a defect rate when the piston pump 1 is manufactured.

The first coupling unit 114 is arranged at the other end of the first piston 110 and is coupled to the second piston 120. A line through which brake oil is flowable is included in the first coupling unit 114.

The inserting hole 116 is defined between the sliding unit 112 and the first coupling unit 114. At least some of the brake oil introduced through an inlet line 14 passes through the inserting hole 116 and flows to an inner line of the first coupling unit 114.

The second piston 120 is coupled to the first coupling unit 114 and operates in conjunction with movement of the first piston 110. The second piston 120 is configured to transmit hydraulic pressure, which is generated due to linear reciprocating movement of the first piston 110, to brake oil stored in an accommodation space 220. When the second piston 120 moves in a direction in which the brake oil is pressurized (leftward direction in FIG. 2), the brake oil stored in the accommodation space 220 moves to an outlet line 16.

The second piston 120 includes all or some of a piston head unit 122, a step unit 124, and a second coupling unit 126.

The piston head unit 122 has a substantially hollow column shape, and at least a part of the inlet ball 150 may be inserted into the piston head unit 122. An outer diameter of at least a part of the piston head unit 122 is a first diameter D1.

The step unit 124 is disposed on an end portion of the piston head unit 122 and may serve as a stopper for the spring cap 130. An outer diameter of at least a part of the step unit 124 is a second diameter D2 which is greater than the first diameter D1.

The second coupling unit 126 is disposed inside the step unit 124 and coupled to the first coupling unit 114. The first coupling unit 114 and the second coupling unit 126 may be press-fitted. For example, the first coupling unit 114 may be coupled to the second coupling unit 126 in a press-fitting manner. However, the present disclosure is not necessarily limited thereto, the first coupling unit 114 and the second coupling unit 126 may be screw-coupled using threads formed on the first coupling unit 114 and the second coupling unit 126.

In the present disclosure, although the first coupling unit 114 is illustrated as a male portion, and the second coupling unit 126 is illustrated as a female portion, the present disclosure is not necessarily limited thereto. For example, the first coupling unit 114 may be a female portion, and the second coupling unit 126 may be a male portion.

Since the second piston 120 has the first diameter D1 and the second diameter D2, the structure is simple, and thus a manufacturing process can be simplified.

The spring cap 130 is coupled to the piston head unit 122 and configured to accommodate the inlet spring 140 and the inlet ball 150. Even when the second piston 120 reciprocates, the inlet spring 140 and the inlet ball 150 may not deviate from initial positions in the spring cap 130.

The spring cap 130 includes all or some of a piston coupling unit 132, a cap head unit 134, a slope unit 136, and a flange unit 138.

The piston coupling unit 132 surrounds at least a part of the piston head unit 122 and is coupled to the piston head unit 122. An inner diameter of the piston coupling unit 132 may be slightly smaller than or equal to the first diameter D1. Accordingly, the piston coupling unit 132 and the piston head unit 122 may be press-fitted and coupled. However, the spring cap 130 and the second piston 120 do not need to be press-fitted and may be screw-coupled.

The inlet spring 140 is accommodated in a space provided in the cap head unit 134. The inside and the outside of the cap head unit 134 fluidly communicate with each other. As an example, the cap head unit may be configured in the form of a cage. An inner diameter of at least a part of the cap head unit 134 has a third diameter D3 smaller than the first diameter D1.

The slope unit 136 is disposed between the piston coupling unit 132 and the cap head unit 134, an inner diameter of the slope unit 136 decreases in a direction from the piston coupling unit 132 toward the cap head unit 134. When the second piston 120 moves in the direction in which the second piston 120 presses the brake oil, the second piston 120 comes into contact with an inner circumferential surface of the slope unit 136 and no longer presses the inlet spring 140 and the inlet ball 150. That is, the slope unit 136 may serve as the stopper for the second piston 120.

The flange unit 138 extends from an end portion of the piston coupling unit 132. The first sealing 160 may be disposed between the flange unit 138 and the step unit 124. The first sealing 160 may prevent brake oil, which is introduced through the inlet line 14, from being introduced into the accommodation space 220.

One side of the inlet spring 140 is in contact with the inlet ball 150, and the other side thereof is fixed to a ceiling of the spring cap 130. The inlet spring 140 presses the inlet ball 150 in a direction in which the motor cam 10 is installed to elastically support the inlet ball 150.

Due to the inlet spring 140, the inlet ball 150 presses the second piston 120 in the direction in which the motor cam 10 is installed. The inlet ball 150 restricts a flow of brake oil discharged from the piston head unit 122 to serve as a check valve.

The sleeve unit 200 is disposed to surround at least a part of the piston unit 100. The sleeve unit 200 includes all or some of the accommodation space 220, a return spring 240, and a discharging hole 260.

The accommodation space 220 is included in the sleeve unit 200 to store brake oil. When the piston unit 100 is moved by the motor cam 10 in a direction in which the brake oil stored in the accommodation space 220 is pressurized, the accommodation space 220 may function as a high-pressure chamber.

The return spring 240 is disposed in the accommodation space 220, one end of the return spring 240 is in contact with the spring cap 130, and the other end thereof is fixed to the ceiling in the sleeve unit 200. The return spring 240 elastically supports the spring cap 130 in the direction in which the motor cam 10 is installed. After the piston unit 100 is moved toward the check valve unit 300 by the motor cam 10, and when the piston unit 100 is returned to an initial position, the return spring 240 provides an elastic force to press the piston unit 100 in the direction in which the motor cam 10 is installed.

The discharging hole 260 is defined in one surface of the sleeve unit 200, and the brake oil, which passes through the discharging hole 260 and is stored in the accommodation space 220, may be discharged to the outside of the sleeve unit 200.

The check valve unit 300 is disposed to face one surface of the sleeve unit 200. The check valve unit 300 is configured so that, when a pressure of the brake oil stored in the accommodation space 220 increases, the brake oil is discharged to the outside of the sleeve unit 200. In this case, the check valve unit 300 may be configured in one of various shapes within the technical idea that the pressure of the brake oil is increased to be discharged to the outside of the sleeve unit 200. The check valve unit 300 according to the present disclosure includes an outlet spring 320 and an outlet ball 340.

The outlet spring 320 and the outlet ball 340 are disposed between the check valve unit 300 and the sleeve unit 200. The outlet spring 320 elastically supports the outlet ball 340 in the direction in which the motor cam 10 is installed. The outlet ball 340 has a spherical shape and is disposed to face the discharging hole 260. The outlet ball 340 controls opening and closing of the outlet line 16.

The filter 400 is disposed to surround at least a part of the piston unit 100. When brake oil flows in a direction from inlet line 14 toward the inserting hole 116, the brake oil passes through the filter 400. As the brake oil passes through the filter 400, foreign matter included in the brake oil may be filtered.

In addition, the piston pump 1 according to the present disclosure may further include the second sealing 520, the backup ring 540, and the guide ring 560.

The second sealing 520 is disposed between the piston housing 12 and the sliding unit 112 and may block a flow of brake oil which flows along an outer side of the piston unit 100.

The backup ring 540 is disposed adjacent to the second sealing 520 and supports the second sealing 520 when the second sealing 520 receives pressure.

The guide ring 560 is disposed adjacent to the backup ring 540 and guides movement of the piston unit 100 so that the piston unit 100 moves linearly when reciprocating.

Hereinafter, an operation state of the piston pump 1 according to one embodiment of the present disclosure will be described in detail.

Figure 4:
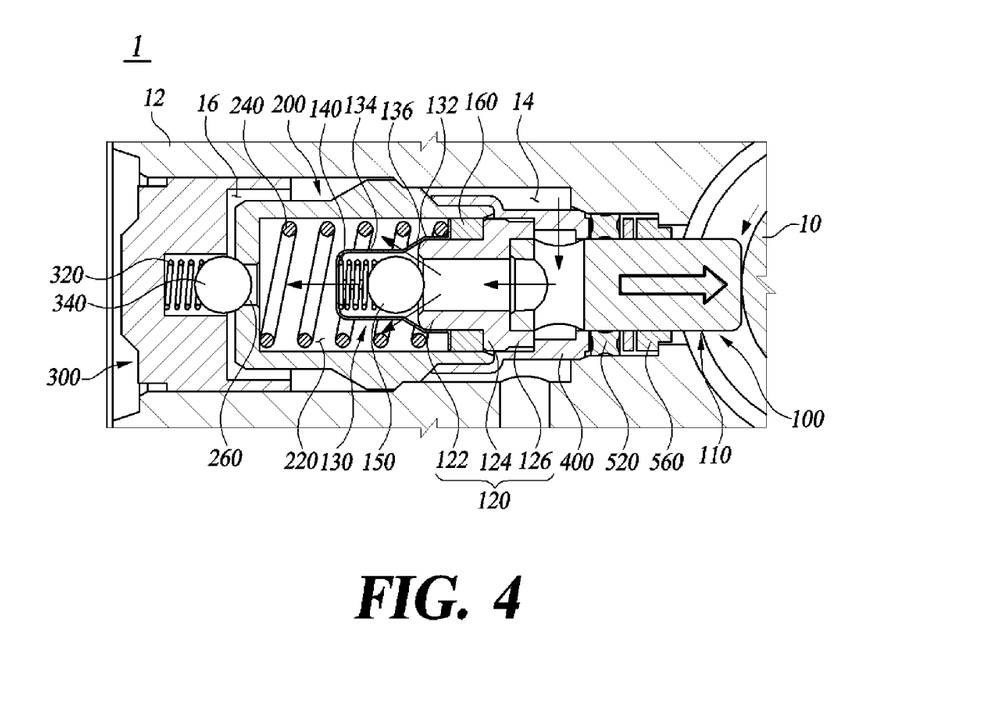
FIG. 4 is a cross-sectional view illustrating a state in which brake oil is supplied to an accommodation space of a sleeve unit according to one exemplary embodiment of the present disclosure.

FIG. 4 is a cross-sectional view illustrating a state in which brake oil is supplied to the accommodation space of the sleeve unit according to one exemplary embodiment of the present disclosure.

A small arrow illustrated in FIG. 4 denotes a flow direction of brake oil, and a large arrow denotes a movement direction of the piston unit 100. Referring to FIG. 4, as the motor rotates, the eccentric motor cam 10 is rotated in one direction (indicated by a curved arrow of FIG. 4). By the rotation of the motor cam 10, the first piston 110 and the second piston 120 are moved in the direction (rightward direction in FIG. 4) in which the motor cam 10 is installed. In this case, the pressure of the brake oil present in the accommodation space 220 of the sleeve unit 200 decreases. Accordingly, the brake oil sequentially passes through the inlet line 14, the inserting hole 116, and the piston head unit 122. As the first piston 110 and the second piston 120 are moved in the direction in which the motor cam 10 is installed, the inlet ball 150 is separated from the second piston 120. The brake oil moved to an inner space of the piston head unit 122 passes through a space between the inlet ball 150 and the second piston 120, which are separated, and sequentially flows through the spring cap 130 and the accommodation space 220.

Figure 5:
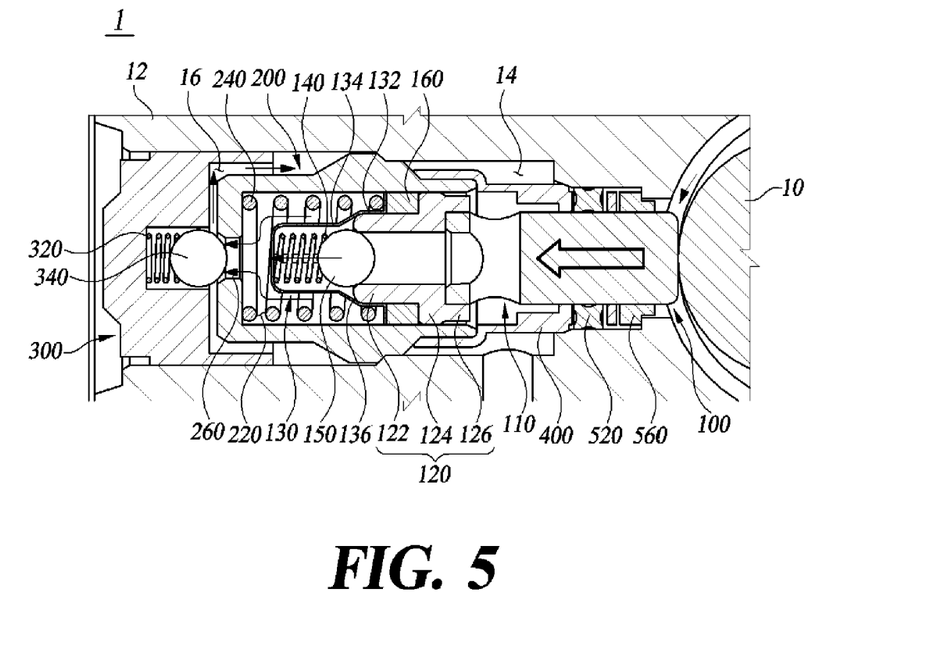
FIG. 5 is a cross-sectional view illustrating a state in which the brake oil stored in the accommodation space of the sleeve unit according to one exemplary embodiment of the present disclosure is discharged to the outside of the sleeve unit.

FIG. 5 is a cross-sectional view illustrating a state in which the brake oil stored in the accommodation space of the sleeve unit according to one exemplary embodiment of the present disclosure is discharged to the outside of the sleeve unit.

A small arrow illustrated in FIG. 5 denotes the flow direction of the brake oil, and a large arrow denotes the movement direction of the piston unit 100. Referring to FIG. 5, by the rotation of the motor cam 10, the piston unit 100 is moved in a direction toward the check valve unit 300. By forward movement of the piston unit 100, the brake oil stored in the accommodation space 220 of the sleeve unit 200 is compressed. Accordingly, the pressure applied to the outlet ball 340 increases, and the outlet spring 320 is compressed. Since the outlet ball 340 is moved in a direction away from the discharging hole 260, the sleeve unit 200 and outlet ball 340 are separated and a space is formed. The brake oil is discharged between the formed space and moves to the outlet line 16. The brake oil passing through the outlet line 16 moves between the piston housing 12 and the sleeve unit 200.

Figure 6:
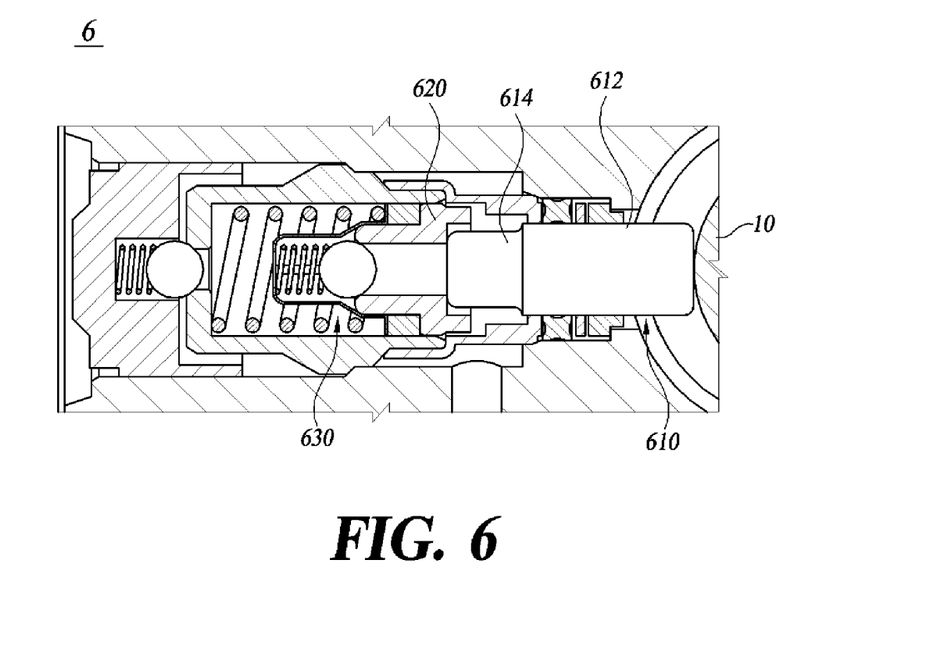
FIG. 6 is a schematic cross-sectional view illustrating a structure of a piston pump for a brake system according to another exemplary embodiment of the present disclosure.

FIG. 6 is a schematic cross-sectional view illustrating a structure of a piston pump for a brake system according to another exemplary embodiment of the present disclosure.

Referring to FIG. 6, a piston unit 600 of a piston pump 6 according to another embodiment includes a first piston 610, a second piston 620, and a spring cap 630.

The first piston 610 according to another embodiment of the present disclosure includes a sliding unit 612 and a first coupling unit 614.

One end of the sliding unit 612 is in contact with the motor cam 10, and the sliding unit 612 reciprocates in a longitudinal axis direction due to rotational movement of a motor cam 10.

The first coupling unit 614 is disposed to extend from the other end of the sliding unit 612 in a direction in which the first coupling unit 614 presses an inner portion of a sleeve unit 200. At least a part of the first coupling unit 614 is configured to be press-fitted into one end of the second piston 620. A coupling relationship between the first piston 610 and the second piston 620 will be described in detail below.

Since shapes and technical features of the second piston 620 and the spring cap 630 according to another embodiment of the present disclosure are the same as or similar to those of the second piston 120 and the spring cap 130 according to one embodiment, detailed descriptions thereof will be replaced with the descriptions of one embodiment.

Figure 7A:
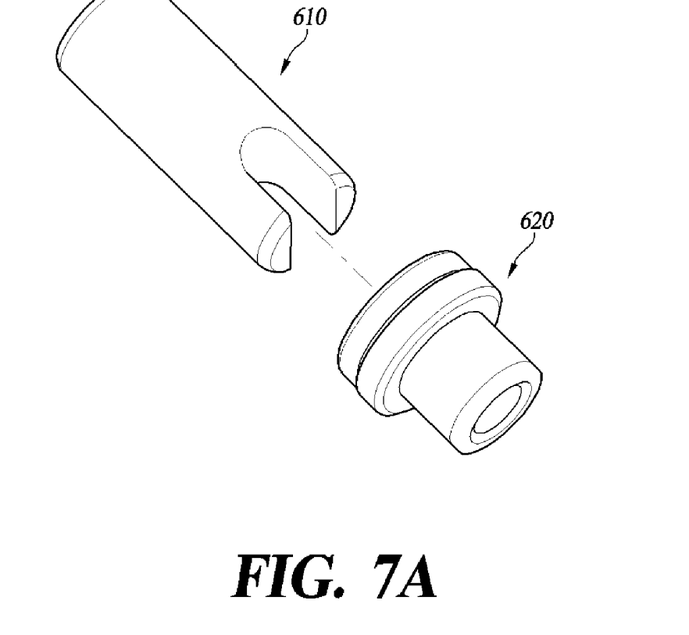
FIGS. 7(A) and 7(B) show perspective views illustrating a piston unit according to another exemplary embodiment of the present disclosure.
Figure 7B:
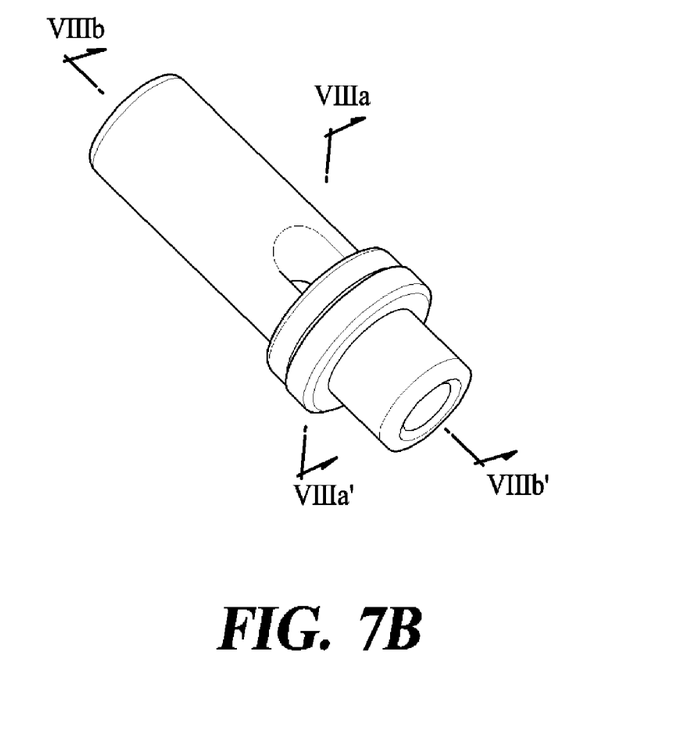
Figure 8A:
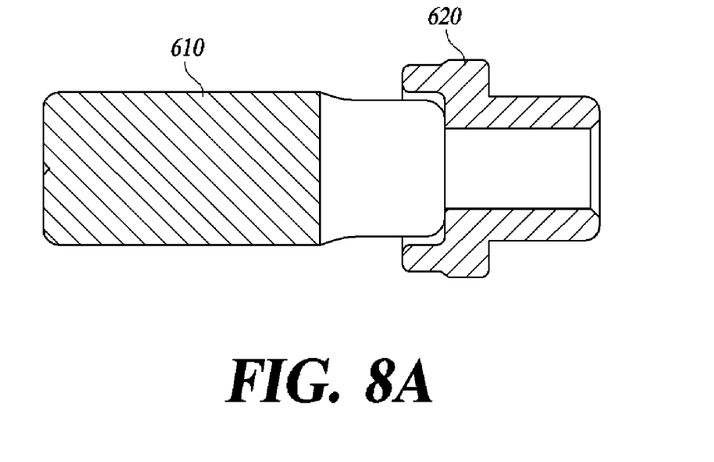
FIGS. 8(A) and 8(B) show cross-sectional views illustrating the piston unit according to another exemplary embodiment of the present disclosure.
Figure 8B:
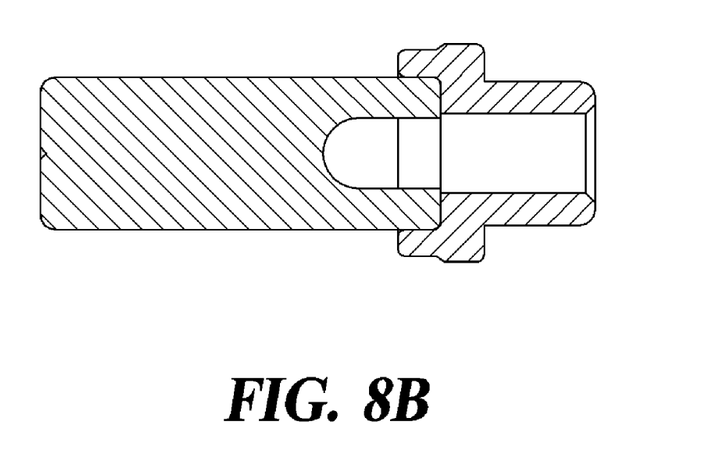

FIG. 7A is an exploded perspective view illustrating a part of the piston unit according to another exemplary embodiment of the present disclosure. FIG. 7B is a perspective view illustrating some coupled parts of the piston unit according to another embodiment of the present disclosure. FIG. 8A is a longitudinal sectional view of the part of the piston unit of FIG. 7B taken along line VIIIa-VIIIa'. FIG. 8B is a longitudinal sectional view of the part of the piston unit of FIG. 7B taken along line VIIIb-VIIIb'.

Referring to FIGS. 7 and 8, a punch process may be performed on one end of the first piston 610 so that brake oil flows. In this case, at least a part of the punched one end is coupled to the second piston 620 as illustrated in FIG. 7B. Further, the second piston 620 according to another embodiment of the present disclosure is punched in a direction perpendicular to the longitudinal axis direction, and a separate line formed to be parallel to the longitudinal axis direction is also not needed. Accordingly, there are effects of simplifying a manufacturing procedure and lowering a defect rate when the piston pump is manufactured.

Still further, as illustrated in FIG. 8B, at least a part of the first piston 610 according to another embodiment of the present disclosure is press-fitted into the second piston 620. Here, coupling of the first piston 610 and the second piston 620 illustrated in FIG. 6 may be understood with reference to a cross-section illustrated in FIG. 8A.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A piston pump comprising:
   a piston unit configured to reciprocate in a piston housing by driving of a motor cam;
   a sleeve unit disposed to surround at least a part of the piston unit and having an accommodation space in which brake oil is stored; and
   a check valve unit disposed to face the sleeve unit and configured to discharge the brake oil to an outside of the sleeve unit when a pressure of the brake oil stored in the accommodation space of the sleeve unit increases,
   wherein the piston unit includes a first piston having a first end in contact with the motor cam and configured to reciprocate, a second piston having a first end coupled to a second end of the first piston and operating in conjunction with reciprocating movement of the first piston to press the brake oil stored in the accommodation space of the sleeve unit, and a spring cap coupled to a second end of the second piston and disposed to accommodate an inlet spring therein,
   wherein the second piston includes:
   a piston head unit having at least a part of which an outer diameter is a first diameter; and
   a step unit having at least a part of which an outer diameter is a second diameter greater than the first diameter,
   wherein the spring cap includes:
   a piston coupling unit coupled to at least a part of the piston head unit;

a cap head unit disposed to accommodate the inlet spring, wherein an inside and an outside of the cap head unit are configured to fluidly communicate with each other;

a flange unit radially extending from an end-most portion of the spring cap; and a slope unit extending between the piston coupling unit and the cap head unit and having an inner diameter which decreases in a direction from the piston coupling unit toward the cap head unit, and configured to stop the second piston by contacting an inner circumferential surface of the slope unit with the second piston when the second piston moves to press the brake oil, wherein the piston unit includes a first sealing disposed between the flange unit and the step unit in an axial direction, wherein the piston coupling unit is disposed between the cap head unit and the flange unit and is coupled to a circumferential surface of the piston head unit, and wherein:

the first piston includes a first coupling unit coupled to at least a part of the second piston;

the second piston includes a second coupling unit disposed to surround the first coupling unit;

the first coupling unit and the second coupling unit are press-fitted to each other; and an outer width of the first coupling unit varies in a radial direction such that at least a portion of the first coupling unit is spaced apart from the second coupling unit when coupled thereto.

2. The piston pump of claim 1, wherein the inner diameter of at least a part of the cap head unit is a third diameter smaller than the first diameter.

3. The piston pump of claim 1, wherein the piston head unit and the piston coupling unit are press-fitted to be coupled.

4. The piston pump of claim 1, wherein the piston unit includes an inlet ball disposed between the second piston and the spring cap and pressed by the inlet spring in a direction toward the second piston.

5. The piston pump of claim 1, further comprising:

a second sealing disposed between the piston housing and the first piston;

a backup ring disposed between the piston housing and the first piston and configured to support the first piston; and a guide ring disposed between the piston housing and the first piston and configured to guide reciprocating movement of the first piston.

6. A piston pump comprising:

a piston unit configured to reciprocate in a piston housing by driving of a motor cam;

a sleeve unit disposed to surround at least a part of the piston unit, and having an accommodation space in which brake oil is stored; and a check valve unit disposed to face the sleeve unit and configured to discharge the brake oil to an outside of the sleeve unit when a pressure of the brake oil stored the accommodation space of the sleeve unit increases, wherein the piston unit includes a first piston having a first end in contact with the motor cam and configured to reciprocate, a second piston having a first end press-fitted and coupled to a second end of the first piston and operating in conjunction with reciprocating movement of the first piston to press the brake oil stored in the accommodation space of the sleeve unit, and a spring cap disposed to accommodate an inlet spring therein and coupled to a second end of the second piston, wherein the second piston includes:

a piston head unit having at least a part of which an outer diameter is a first diameter; and a step unit having at least a part of which an outer diameter is a second diameter greater than the first diameter, wherein the spring cap includes:

a piston coupling unit coupled to at least a part of the piston head unit;

a cap head unit disposed to accommodate the inlet spring, wherein an inside and an outside of the cap head unit are configured to fluidly communicate with each other;

a flange unit radially extending from an end-most portion of the spring cap; and a slope unit extending between the piston coupling unit and the cap head unit and having an inner diameter which decreases in a direction from the piston coupling unit toward the cap head unit, and configured to stop the second piston by contacting an inner circumferential surface of the slope unit with the second piston when the second piston moves to press the brake oil, wherein the piston unit includes a first sealing disposed between the flange unit and the step unit in an axial direction, wherein the piston coupling unit is disposed between the cap head unit and the flange unit and is coupled to a circumferential surface of the piston head unit, and wherein:

the first piston includes a first coupling unit coupled to at least a part of the second piston;

the second piston includes a second coupling unit disposed to surround the first coupling unit;

the first coupling unit and the second coupling unit are press-fitted to each other; and an outer width of the first coupling unit varies in a radial direction such that at least a portion of the first coupling unit is spaced apart from the second coupling unit when coupled thereto.

7. The piston pump of claim 6, wherein the first end of the first piston is punch-processed in a direction perpendicular to a longitudinal axis direction so that the brake oil is flowable.

8. The piston pump of claim 5, wherein the backup ring is disposed between the second sealing and the guide ring.

* * * * *